United States Patent [19]

Monroe et al.

[11] Patent Number: 5,259,025
[45] Date of Patent: Nov. 2, 1993

[54] METHOD OF VERIFYING FAKE-PROOF VIDEO IDENTIFICATION DATA

[75] Inventors: Midori J. Monroe, Vancouver, Canada; George Y. Huang, Chicago; Tony D. Martin, Arlington Heights, both of Ill.

[73] Assignee: Audio Digitalimaging, Inc., Arlington Heights, Ill.

[21] Appl. No.: 897,900

[22] Filed: Jun. 12, 1992

[51] Int. Cl.$^5$ .............................................. H04L 9/32
[52] U.S. Cl. .................................... 380/23; 380/24; 380/25; 380/49; 380/50; 340/825.31; 340/825.34; 382/2; 235/379; 235/380
[58] Field of Search ................................ 380/4, 22–25, 380/49, 50; 235/379, 380; 340/825.31, 825.34; 382/1–5

[56] References Cited

U.S. PATENT DOCUMENTS

| | | | |
|---|---|---|---|
| 3,620,590 | 11/1971 | Barker | 380/4 |
| 4,580,134 | 4/1986 | Campbell et al. | 340/703 |
| 4,650,981 | 3/1987 | Foletta | 235/449 |
| 4,707,592 | 11/1987 | Ware | 235/379 |
| 4,745,268 | 5/1988 | Drexler | 235/487 |
| 4,879,747 | 11/1989 | Leighton et al. | 380/23 |
| 4,961,229 | 10/1990 | Takahashi | 395/2 |
| 4,979,159 | 12/1990 | Tsuruoka et al. | 369/58 |
| 4,985,920 | 1/1991 | Seki | 380/23 |
| 4,993,068 | 2/1991 | Piosenka et al. | 380/23 |
| 4,995,081 | 2/1991 | Leighton et al. | 380/23 |
| 5,018,017 | 5/1991 | Sasaki et al. | 358/209 |
| 5,027,401 | 6/1991 | Soltesz | 380/54 |
| 5,053,608 | 10/1991 | Senanayake | 235/380 |
| 5,057,924 | 10/1991 | Yamada et al. | 358/209 |
| 5,067,029 | 11/1991 | Takahashi | 358/909 |
| 5,068,744 | 11/1991 | Ito | 358/310 |

*Primary Examiner*—Bernarr E. Gregory
*Attorney, Agent, or Firm*—Wood, Phillips, VanSanten, Hoffman & Ertel

[57] ABSTRACT

A fake-proof card verification system allows for the reading of data from an EEPROM memory device. A photographic-type image is stored in the memory device. The data comprises a data table containing randomly distributed unique serialized information. This information may be the serial number of the encoding read/write terminal, or the issue number of the particular identification information created by the encoding terminal. Desired verification data is downloaded from a central processing system. Advantageously, the system uses color cell compression for the acquisition, digitization and compression of the photographic-type image, which may be a facial representation, fingerprint, signature, voice print, eye retina or any other unique personal identification in a compressed form which may read by the decoding system to verify the positive identification of the presenter.

22 Claims, 7 Drawing Sheets

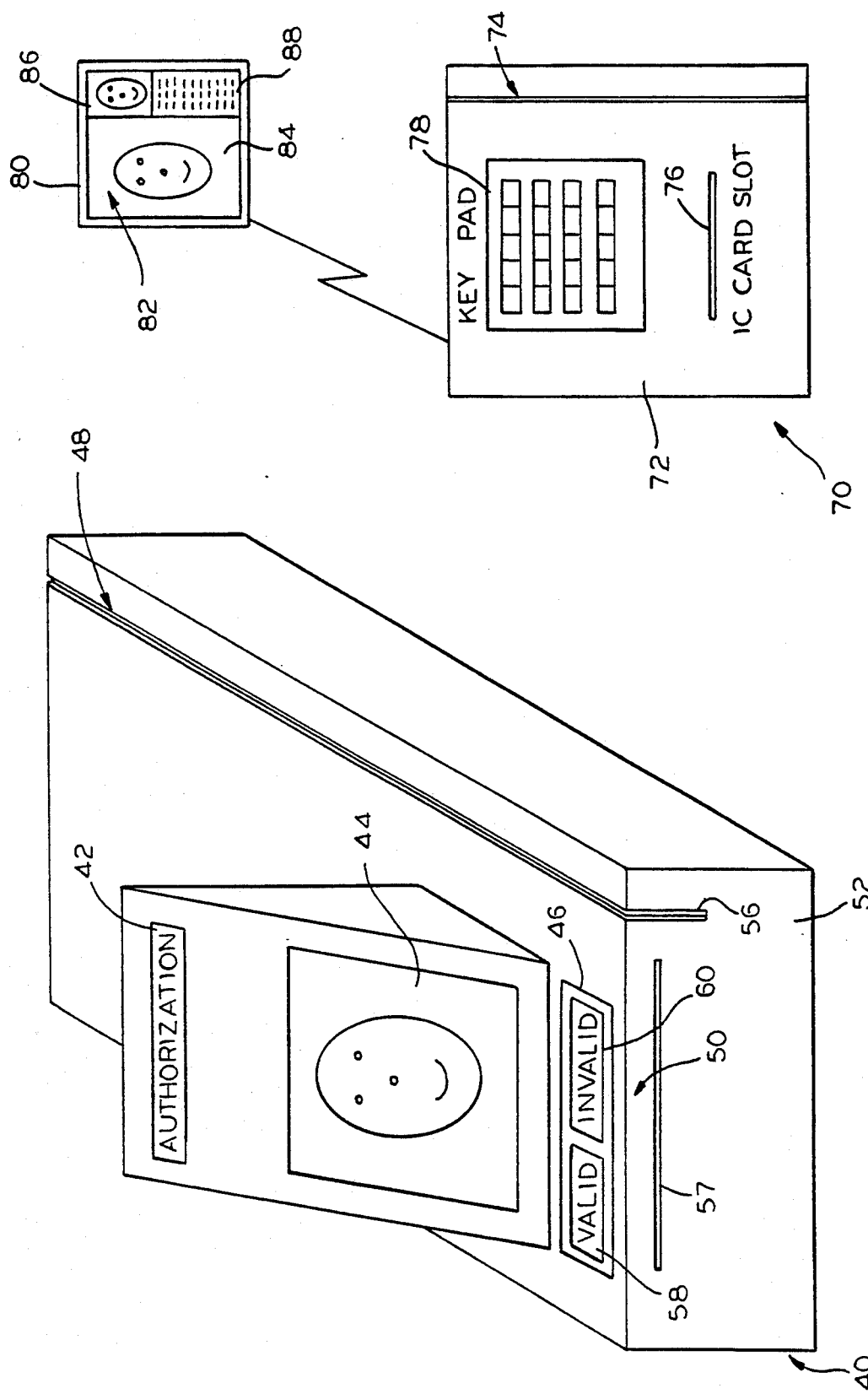

FIG. 6

VIDEO IMAGE DATA

| AND | OFFSET TABLE BYTES | DATA DISBURSEMENT AREA | |
|---|---|---|---|
| H | 2 4 6 9 6 8 1 A 3 C F 2 4 | 9 A 0 F C C B 3 4 9 7 8 C C 2 3 9 4 2 6 7 | 3 C F 2 3 |
| L | 1 8 5 2 1 2 4 8 C 3 7 F | 7 0 6 6 3 9 4 5 6 7 F 2 1 1 0 3 4 5 6 7 F C | 7 9 7 1 C |
| # | 0 1 2 3 4 5 6 7 8 9 10 11 | 12 13 14 15 16 17 18 19 20 21 22 23 24 25 26 27 28 29 30 31 32 33 | |

READ DATA TABLE

| AND | OFFSET TABLE BYTES | DATA DISBURSEMENT AREA | |
|---|---|---|---|
| H | 2 4 6 9 6 8 1 A 3 C F 2 4 | 9 A 0 F C C C B 3 C 4 C 9 7 8 C C C 2 3 9 | |
| L | 1 8 5 2 1 2 4 8 C 3 7 F | 7 0 6 6 3 1 9 4 5 6 2 7 3 8 2 2 1 4 0 3 4 5 | |
| # | 0 1 2 3 4 5 6 7 8 9 10 11 | 12 13 14 15 16 17 18 19 20 21 22 23 24 25 26 27 28 29 30 31 32 33 | |
| | | * * * * | |

— 100

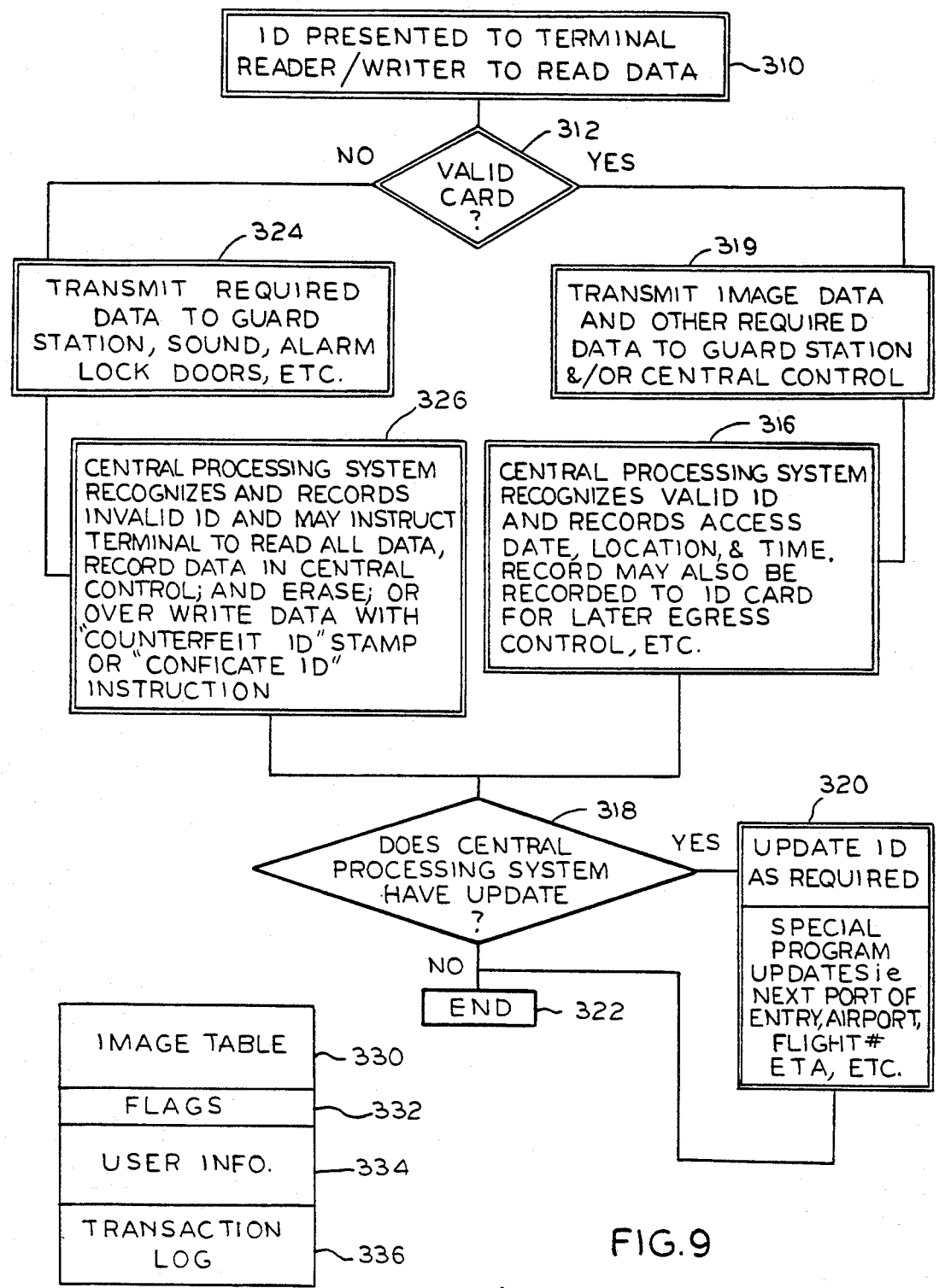

METHOD OF VERIFYING FAKE-PROOF VIDEO IDENTIFICATION DATA

FIELD OF THE INVENTION

This invention relates to customer cards and, more particularly, to a system for authenticating use of the card using a method of verifying fake-proof video identification data.

BACKGROUND OF THE INVENTION

Various forms of customer cards are in common use. In many instances it is readily possible to create a fake or fraudulent card which can be used to the detriment of the card issuer or an establishment accepting a card. For example, one common form of an identification card is a state issued drivers license. This card usually includes a photograph of the card holder. The photograph on a drivers license can be altered. Alternatively a fraudulent card can be made. Credit or debit cards are often used for purchases. Such cards include embossment of the card holder's name and card number. Often, these cards also include a magnetic stripe to provide a higher level of security. However, these cards can also be easy to counterfeit. To verify transactions using such cards, it is often necessary to compare the card number to a list of fraudulent or stolen cards or by telephoning a credit card verification service.

In order to minimize fraud, certain card identification systems have been used in which a memory in some form on the card stores data representing a user's credentials, such as a photograph or fingerprint. Such systems are disclosed, for example, in Piosenka et al., U.S. Pat. No. 4,993,068 and Soltesz, U.S. Pat. No. 5,027,401. Both patents disclose a system in which a photographic representation is stored in the memory means for later retrieval at a remote site. However, it is not apparent that such systems would provide adequate protection from counterfeiting.

The present invention is directed to solving one or more of the above problems.

SUMMARY OF THE INVENTION

In accordance with the invention there is disclosed a method of validating at a central location a transaction involving presentation of a user identification device at a remote location.

Broadly, there is disclosed herein a method of validating at a central location a transaction occurring at a remote location, the transaction comprising presenting a user identification device including memory means for storing fake-proof video information data. The method comprises the steps of transferring from a processing system at the central location to a processing system at the remote location unique digitized system verification information, the digitized verification information comprising a desired verification data table; operating the remote location processing system in response to a user identification device being presented by reading a video data table from a memory means of the presented user identification device, the video data table including a video information data table having elements of verification data at select distributed locations, separating the verification data from the video data table to provide the information data table, creating an actual verification data table using the separated verification data, comparing the actual verification data table to the desired verification data table to verify authenticity of the user identification device, and communicating with the central location processing system to report authenticity of presented user identification device; and recording at the central location processing system a log of remote transactions.

It is a feature of the invention to further include the step of converting the video information data table for display on a display device at the remote location to verify authenticity of the user.

A further feature of the invention at the converting step comprises the step of a decoding compressed digitized video information stored in the information data table.

In accordance with one aspect of the invention, the video data table comprises a table of N bytes of data and the separating step includes the steps of creating an offset table using the first M bytes of data, where M is less than N, the offset table defining an offset value for each of a plurality of index numbers, selecting index values using video table data and sequentially removing bytes of data from the video data table at positions related to the offset value associated with the index values.

It is another feature of the invention that the transferring step comprises transferring digitized system verification information identifying a unique serial number assigned to a terminal used to encode the video data table.

It is a further feature of the invention that the transferring step comprises transferring digitized system verification information identifying an issue serial number assigned to a user identification device.

In accordance with another aspect of the invention, the central location processing system is operated by receiving transaction verification information from the remote location processing system, performing the recording step, determining based on the transaction verification information that the user identification device should be updated and in response thereto communicating with the remote location data processing system the updated information.

In accordance with another aspect of the invention there is further provided the step at the remote location of recording data on the presented user identification device memory means according to the received update information.

In one embodiment to the invention, the remote location processing system communicates with the central location processing system by transmitting and receiving radio frequencies signals.

In another embodiment of the invention remote location processing system communicates with the central location processing system by transmitting and receiving telephonic signals.

In accordance with still another embodiment of the invention the remote location processing system communicates with the central location processing system by transmitting and receiving on a processing system communication network.

In accordance with still a further embodiment of the invention the method is used to validate at a central location a transaction occurring at any one of the plurality of remote locations.

Advantageously, the system uses digital color cell compression of video images combined with multiple text information fields segregated into respective data fields. The text information fields are accessible from specific decoding terminals, such text field designation and image encryption occurring at the time of encoding at an encode read/write terminal. The data is stored on a EEPROM type memory chip which utilizes a microprocessor or optical storage device and has sufficient data storage capacity.

Further features and advantages of the invention will be readily apparent from the specification and from the drawing.

BRIEF DESCRIPTION OF THE DRAWING

FIG. 2 is a perspective view of a decoding device according to one embodiment of the invention utilized in the network of FIG. 1;

FIG. 3 is a perspective view of a decoding device according to an alternative embodiment to the invention used in the network of FIG. 1;

FIG. 5 illustrates an exemplary encrypted video image data table read from a user identification card;

FIG. 6 illustrates the data table of FIG. 5 after encrypted verification data has been removed;

FIG. 9 is a flow diagram illustrating communication between devices in the network of FIG. 1; and FIG. 10 is an illustration of the memory map for data stored on a user identification device in form of a customer card.

DETAILED DESCRIPTION OF THE INVENTION

In accordance with the invention, a method is disclosed for validating at a central location a transaction occurring at a remote location. The transaction comprises presenting a user identification device including a memory storing fake-proof video information data for verifying authenticity of the card presented at the remote location.

Figure 1:
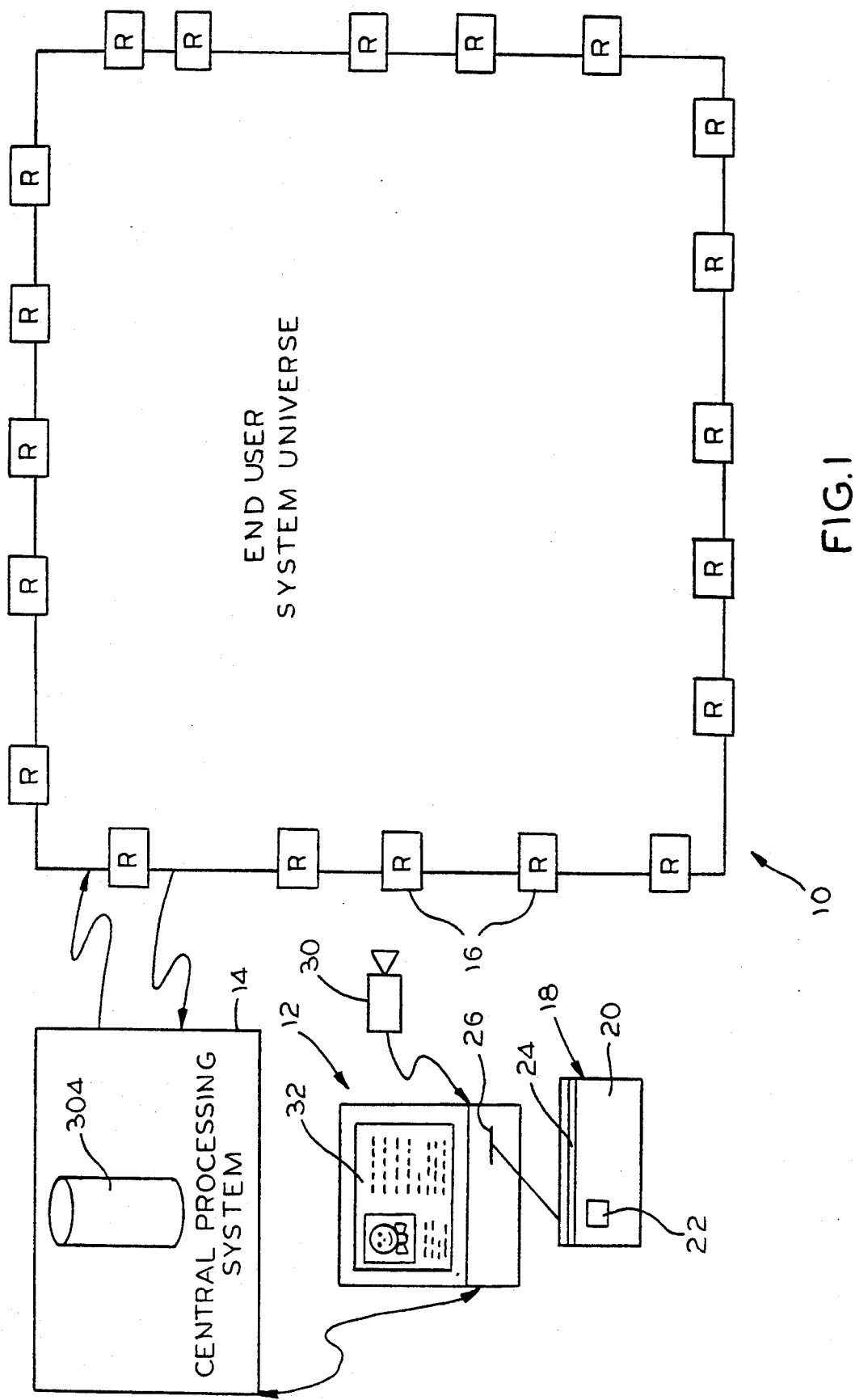
FIG. 1 is a generalized block diagram illustrating a network utilizing a method of validating transactions.

With reference to FIG. 1, a communication network 10 in which transactions are to be performed is illustrated. The network can be used in endless applications such as a network for transacting purchases, employee identification, or generally for user identification.

The network 10 includes an encoding terminal 12, a central processing system 14 and a plurality of decoding terminals 16. The encoding terminal 12 comprises a personal computer system and associated peripheral components. The encoding terminal 12 is used for recording verification information on a user identification card 18. The user identification card 18 comprises an integrated circuit card, often referred to as a "smart card". The card 18 comprises a plate 20 including an integrated circuit 22 and a magnetic stripe 24. The magnetic stripe 24 magnetically stores data. The integrated circuit 22 comprises an EEPROM memory chip with a microprocessor.

The memory card 18 may take any known form. An example of a typical such card is illustrated and described in Foletta U.S. Pat. No. 4,650,918. The particular type of card is not itself part of the invention other than serving as a memory storage device for storing fake-proof video information data for later retrieval. Particularly, the card 18 is inserted in a slot 26 of the encoding terminal 12. Data is read from and written to the circuit 22 as controlled by the encoding terminal 12.

The encoding terminal 12 includes a CCD Video camera 30 which can be used, for example, to take a photographic image of an individual which is displayed on a monitor 32 and digitized. The digitized image is encrypted with randomly distributed unique serialized information which may be unique to the terminal 12 or an issue number of the particular card 18. The encrypted image data is stored on the card's integrated circuit 22. For example, a plurality of encoding terminals 12 may be used, with each terminal having a distinct serial number. The serial number of the particular terminal 12 is encrypted with the image data so that, when later retrieved at a decoding device 16, a serial number can be removed and compared against a table of valid serial numbers to ensure authenticity Alternatively, or additionally, an issue number of the particular memory card 18 may be encrypted. This identification number may be, for example, a user's account number or any other type of serial number which would also be accessible within the network 10.

Particularly, the encoding terminal 12 comprises an encoding terminal such as disclosed in our pending application Ser. No. 07/895,642, filed Jun. 9, 1992 the specification of which is hereby incorporated by reference herein.

With reference to FIG. 2, a point of sale terminal (POST) 40 may be used in the network 10 as a decoding terminal 16, see FIG. 1. The POST 40 in its most common form would be used by a seller of goods or services for executing payment transactions. For example, the POST 40 maybe used as a peripheral device to a conventional cash register.

The POST 40 is used in connection with a user identification card 18, see FIG. 1. As discussed above, the card 18 stores video verification information in the memory components of the integrated circuit 22. This video verification information includes a data table storing data representing a video image for some personal characteristic of the card holder, such as a facial photograph. The data table is encrypted with verification data used for verifying authenticity of the card. This verification data, along with the display of the image represented by the data table can be used by POST 40 for verifying authenticity of both the card 18 and the cardholder.

The POST 40 comprises a customized personal computer terminal having an LCD text display device 42, a color LCD video image display device 44, a video image verify push-button panel 46, a magnetic stripe reader 48 and a smart card reader 50. All components of the POST 40 are self-contained within a housing 52. The card 18, see FIG. 1, can be inserted in a slot 54 of the smart card reader 50. Alternatively, the card 18 can be pulled through a slot 56 of the magnetic stripe reader 48. The text display 42 is used for displaying messages, while the image display 44 is used for displaying, for example, an image of the cardholder. The push-button 46 includes push-buttons 58 and 60 labelled VALID and INVALID, respectively.

The POST 40 may be as described in our U.S. patent application Ser. No. 07/895,641, Filed Jun. 9, 1992, the specification of which is hereby incorporated by reference herein, now U.S. Pat. No. 5,214,699. As described therein, the card 18 is inserted in the slot 54 and a video image data table stored in the memory circuit 22 is read. Encrypted verification data from the data table is separated to provide a video information data table which is used for generating a display on the display device 44. The verification data is compared to a desired verification data stored in the POST 40 for verifying authenticity card. The push-button panel 46 is used by the terminal operator for indicating if the photographic image on the display 44 matches the cardholder to indicate the card 18 is either a VALID card or an INVALID card. Resultingly, the LCD text display 42 provides a message to the operator indicating acceptability of the transaction.

With reference to FIG. 3, a decoding terminal 70 according to an alternative embodiment of the invention is illustrated. The decoding terminal 70 may be used as a security device for enabling entry to a building or past a security check point. The terminal 70 may also be used as one of the decoding terminals 16 in the network 10, see FIG. 1.

The terminal 70 is generally similar to the POST 40 except that it includes two separate components. A first housing 72 includes a mag stripe reader 74, a smart card reader 76 and a key pad 78. The housing 72 may be located at an entry door accessible to a person desiring entry through the door. A second, remote housing 80 includes a monitor 82. In the illustrated embodiment, the monitor shows a display sectored into three areas. A first area 84 illustrates a live image generated from a camera (not shown) showing the individual present at the exterior terminal housing 72. Upon insertion of a card 18 into the card reader 76, the image stored thereon is read, and encrypted data separated as discussed above, with the image then being displayed in the display section 86. A third section 88 displays any relevant text also stored on the card 18.

The second housing 80 may be used by a security guard at a security station for comparing the live image in the first section 84 with the stored image in the second section 86 for permitting entry. Such a terminal 70 in operation would be conceptually similar to the POST 40.

Figure 4:
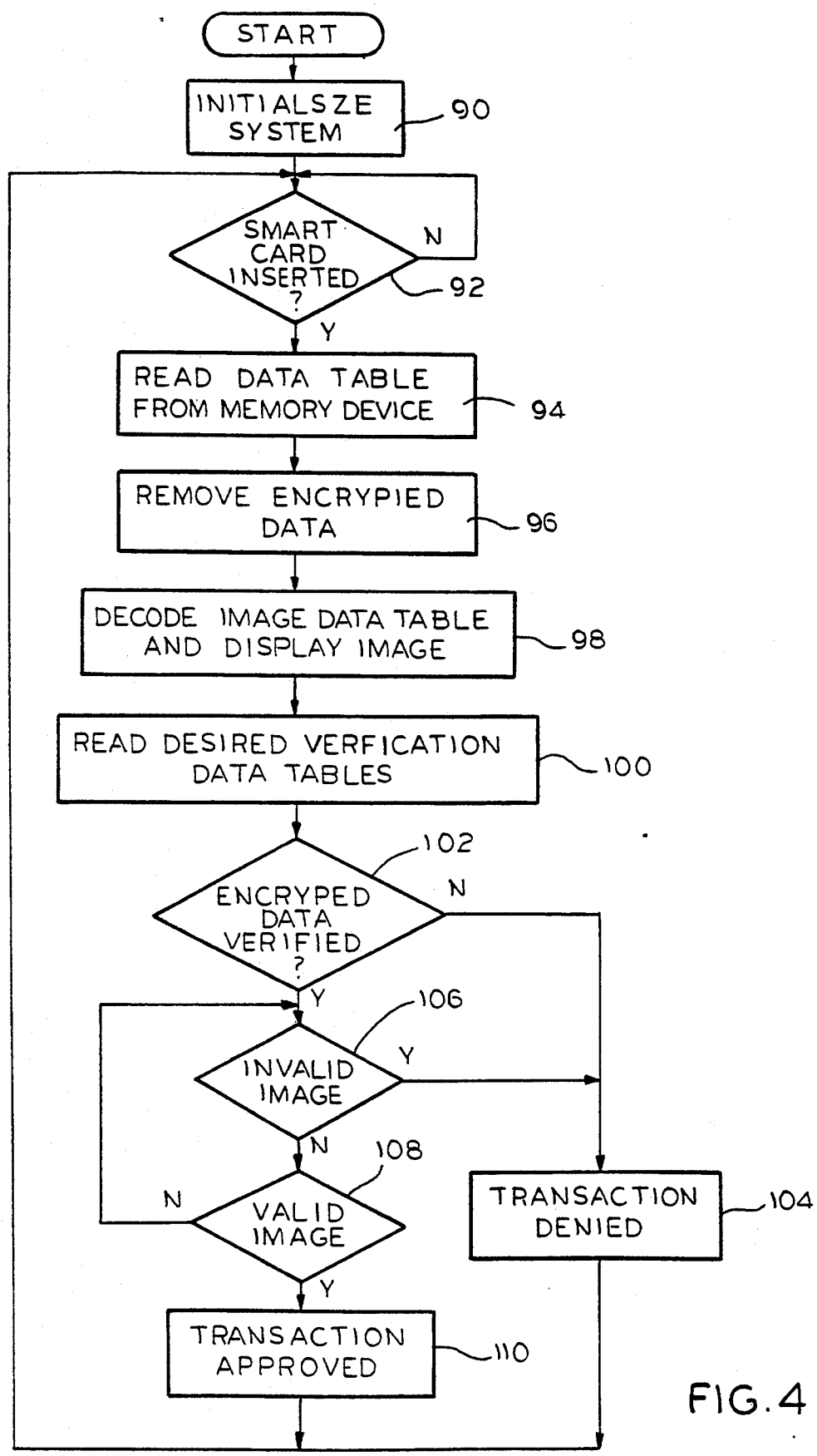
FIG. 4 is a flow chart for a program implemented by the decode terminal of FIG. 1 for decoding a video image data table.

The selected decode terminal 16 is operated by a control program which controls the sequence of operation. This program may include conventional operating systems and other main or executive programs for controlling overall operation. These and other application programs are not described in any detail herein, as they do not relate to the inventive features of the system. With reference to FIG. 4, a flow diagram illustrates operation of a control program for decoding fake-proof photographic images stored on the integrated circuit 22 of the memory card 18, see FIG. 1.

Upon starting the decode system program using the POST 40, a block 90 is operative to initialize the system. A decision block 92 continuously checks the smart card reader 50 to determine if a card 18 has been inserted in the slot 54. At this point, the program may check for other functions, such as a card in the mag stripe reader 48. However, these programs are not described as they are unrelated to the inventive concepts herein.

Once a card 18 is inserted, then a block 94 reads a data table from memory circuits of the card's integrated circuit 22. As described below, the data table includes a video image or information data table encrypted with verification data. The encrypted verification data is removed at a block 96 and the image data table is decoded and the image displayed on the display 44 at a block 98. At a block 100 desired verification data tables are read from the a decode terminal memory (not shown). These data tables comprise data representing acceptable encrypted data to be removed from a stored image data table. At a decision block 102 the desired verification data tables are compared to an actual verification data table, comprising the removed encrypted data from block 96, to find a match. If no match is found, then a "transaction denied" message is displayed on the text display 42 at a block 104 and the routine ends as by returning to the decision block 92.

If the encrypted data is verified, as determined at the decision block 102, then a decision block 106 determines if the image displayed on the display device 44 is valid. Particularly, if the displayed image is the facial photograph of the cardholder, then the POST operator must verify a match between the displayed image and the cardholder. If the operator defines the match to be acceptable, then the VALID push button 58 is depressed. Otherwise, the INVALID push button 60 is depressed. A decision block 106 determines if the INVALID push button is depressed, and if so proceeds to the block 104 to deny the transaction. If the INVALID push button 60 is not depressed, then a decision block 108 determines if the VALID button is depressed. If not, the control loops back to the decision block 106 until one of the push buttons 58 or 60 is depressed. If the VALID push button 58 is depressed, then the text display 42 displays a "transaction approved" message at a block 110 and the routine ends as by returning to the decision block 92.

The procedure for removing encrypted data, performed at the block 96 of FIG. 4, is now described with reference to FIGS. 5 and 6. FIG. 5 illustrates a data table 112 read from an identification card 18. This data table comprises a video information data table having elements of verification data at select distributed locations. FIG. 6 illustrates a video image data table 114 after removal of encrypted data. Each data table 112 and 114 is represented by bytes consisting of two hex characters. The byte number is illustrated in the bottom row and the high character is shown above the low character for each byte number. Particularly, in each table 112 and 114 the byte number zero consists of the high character 2HEX and low character 1HEX.

The number of bytes in the data table 112 is dependent on the particular system requirements The illustrated data table numbers only the first thirty-four bytes, as required for the encryption algorithm described herein below. Byte number zero is described as an AND byte, while bytes 1-16 are defined as offset table bytes. Bytes 17 on up are defined as data disbursement area bytes. Particularly, the AND byte number zero is used to AND the high and low characters along with the offset table bytes to create an offset table. The offset table is used to determine table positions at which elements of verification data are located in the data disbursement area.

Initially, the zero byte is converted to binary and the high four bits are shifted four positions and exclusive ORed with the low byte as in the following equation (1):

00000010B (XOR) 00000001B
= 00000011B

The exclusive ORed result in equation (1) is then ANDed with byte numbers 1-16 to create an offset table having sixteen offset values. Each offset value is identified with an index, or IDX, number 0-15. To insure a non-zero offset value, the binary number 1 is added to the result. For example, the offset value for IDX 2, related to byte number 3, is calculated using the following equation (2):

$$(1001\ 0010B\ \text{AND}\ 0000\ 0011B) + 0000\ 0001B$$
$$= 0000\ 0010 + 0000\ 0001 = 00000011B$$
$$= 3\ \text{Dec.}$$

The resultant offset table is a follows:

| OFFSET TABLE | |
|---|---|
| IDX # | OFFSET VALUE |
| 0 | 1 |
| 1 | 2 |
| 2 | 3 |
| 3 | 2 |
| 4 | 3 |
| 5 | 1 |
| 6 | 1 |
| 7 | 1 |
| 8 | 4 |
| 9 | 4 |
| 10 | 4 |
| 11 | 4 |
| 12 | 1 |
| 13 | 3 |
| 14 | 3 |
| 15 | 4 |

The offset table is used to determine the locations in the data table disbursement area at which verification data is to be removed. This verification data may be, for example, a terminal serial or identification number for the terminal (not shown) used to store the data table on the card 18. For example, a plurality of encoding terminals 12 may be used, with each terminal 12 having a distinct serial number. The serial number of the particular terminal 12 is encrypted with the image data so that, when retrieved at the POST terminal 40, the serial number can be removed and compared against a table of valid serial numbers stored in the POST's memory to insure authenticity. Alternatively, or additionally, an issue number of the particular card 18 may be encrypted. This identification number may be, for example, a user's account number or any other type of serial number which would also be stored in the master database for verification.

In the described example, four verification bytes are included in the data table 112. These bytes will be removed, as described below, to create the following verification table.

| VERIFICATION TABLE | | | |
|---|---|---|---|
| C | C | C | C |
| 1 | 2 | 3 | 4 |

Figure 7:
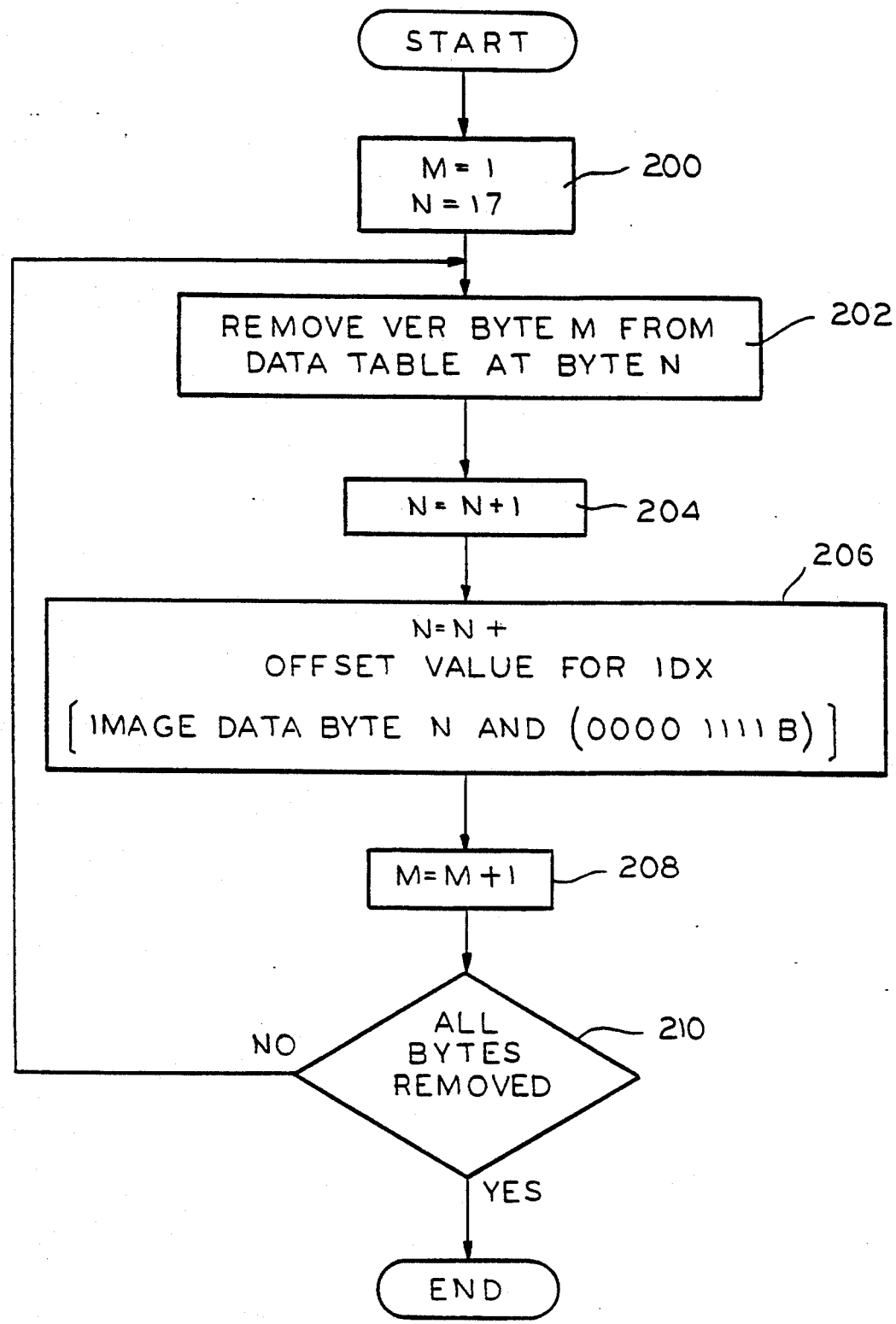
FIG. 7 is a flow chart illustrating operation of the program for performing removal of encrypted verification data.

The encrypted verification data is removed using steps illustrated in the flow diagram of FIG. 7. Removal begins at a block 200 which sets a variable M equal to 1 and N equal to 17. The variable M relates to which verification byte is being removed and the variable N is used to identify the position in the data table 112 at which the verification byte is to be removed from. N is set equal to 17 initially since the byte number 17 is the first byte in the data disbursement area. A block 202 removes the verification byte M from the data table 112 at byte N. Particularly, the first verification byte C/1 is removed from the seventeenth byte position in the data table 112. This is illustrated in the data table 112 of FIG. 4 as byte 17 having an asterisk thereunder. A block 204 increments the variable N by one. This is done because verification bytes are not inserted adjacent one another. A block 206 then adds an offset value to the variable N. The offset value is determined by calculating an IDX number by ANDing the image data for byte N with the binary character $$00001111B$$

This drops the high character from the selected N byte number to insure an IDX number between zero and fifteen. For example, initially, data byte number 18, which is C/9, is ANDed to result in the value 0/9. The offset value for IDX 9 is four. Thus, the variable N is set equal to 18+4=22. A block 208 then increments the value M. A decision block 210 determines if all verification bytes have been removed based on a preselected number stored in the POST's memory. If not, then control returns to the block 202, which removes the next verification byte, in this case verification byte number 2, from the image data table at byte N, i.e., byte 22. This process continues until all verification bytes are removed from the distributed locations throughout the data dispersement area of the table 112. Particularly, the verification bytes are removed at bytes 17, 22, 24 and 29, as shown by asterisks in FIG. 5.

By using the disclosed algorithm, which relies on the first seventeen bytes in the data table 112, an encryption results which is different for each different data table stored on a memory card. Thus, it is not possible to create a counterfeit card by always inserting verification numbers at preselected locations. Instead, the locations are dependent upon the actual data contained in the data table, as described.

Figure 8:
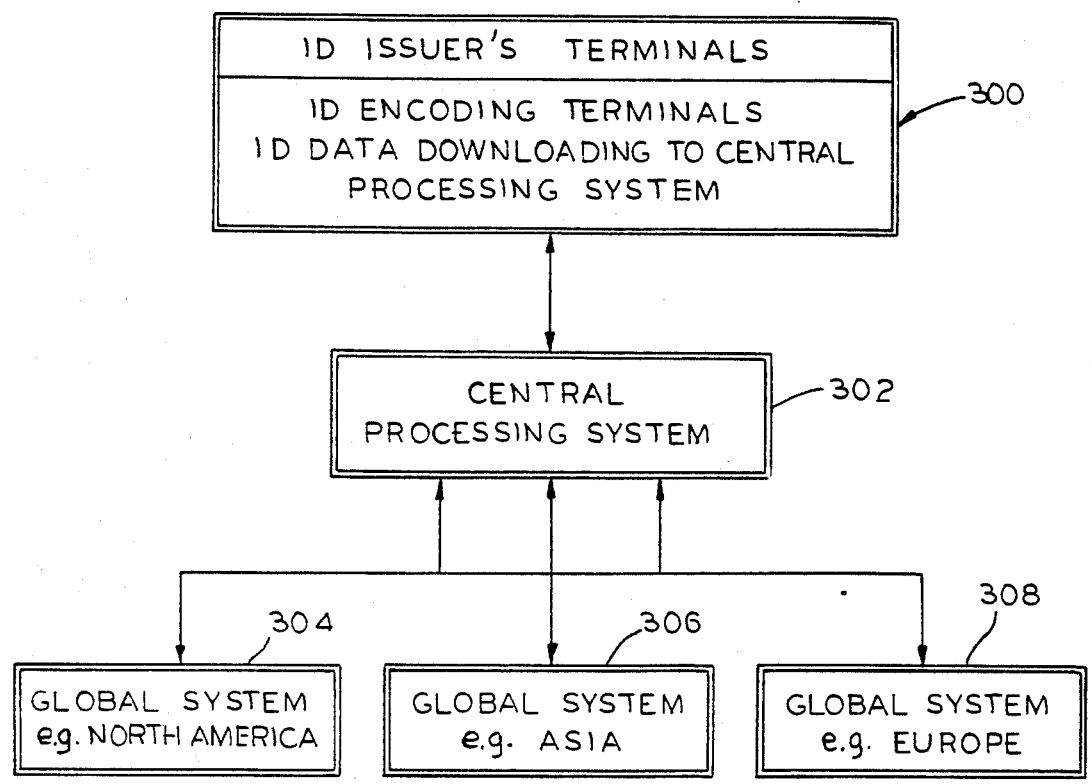
FIG. 8 is a block diagram functionally illustrating the network of FIG. 1.

With reference to FIG. 8, a functional block diagram illustrates use of the network 10 in a typical application. A block 300 illustrates functionality performed in the issuance of encoded identification cards 18, see FIG. 1. This entails the use of encoding terminals 12 generating the data for storage on the cards integrated circuit 22. The data is downloaded to the central processing system 14 at a block 302 for storage in a memory 304, see FIG. 1. Typically, the information downloaded would be the the verification information which comprises the encrypted data in the video image data table of each card 18. Although the image data itself could also be downloaded, it is typically not necessary to do so.

Communication between the blocks 300 and 302 can be done using a local area network or wide area network or by satellite or telephonic communication, as necessary or desired.

The central processing system at the block 302 performs overall supervisory control within the user network 10. This includes receipt and storage of data from any of the decoding terminals 16.

Specifically, the block 302 communicates with global system blocks 304, 306 and 308 representing different geographic territories. These communications can be done by satellite link, radio frequency or microwave transmission or via a wide area network. The central processing system at the block 302 would download verification information to any or all of the global systems 304, 306, or 308 and then receive back information relating to transactions occurring at any of the global systems 304, 306 or 308. The decoding terminal 16 stores the verification information for later comparison with encrypted data removed from an image data table read from a card 18.

With reference to FIG. 9, a flow diagram illustrates the processing of a transaction occurring at a decode terminal 16, such as the terminals 40 and 70, see FIG. 2 and 3, respectively. In the flow diagram the blocks including double line outline relate to processes at the decoding terminal 16. Blocks in single line outline relate to processes occurring in the central processing system 14, see FIG. 1.

With reference to both FIG. 1 and 9, the process for implementing a transaction begins at a block 310 when an ID card 18 is presented at a decoding terminal 16. At the decoding terminal the image table data is read from the integrated circuit 22, as discussed above. A decision block 312 at the decoding terminal 16 determines if the card is VALID. This determination is based on the removal of encrypted data from the video image table and comparison of the same to tables stored in the decoding terminal 16. In the case of the terminal system 70 of FIG. 3, the image data might be transmitted to the guard station terminal 80 for display. Alternatively, the image data or other required data such as relating to the specific transaction, would be uploaded to the central processing system 14.

At a block 316 the central processing system recognizes the VALID ID and records access date, location and time of the transaction. Additional information may also be recorded, such as for later egress control. A decision block 318 then determines if the central processing system needs to update the card 18. This would be depend on the particular application. If so, then the ID card 18 is updated at a block 320. Again, the particular form of update would depend on the system application. The processing of the transaction then ends at a block 322.

Returning to the block 312, in some instances the card maybe determined to be INVALID. This could be done, for example, by comparing the encrypted information to stored tables to find a match. As discussed above, this match could relate to a serial number for the encoding terminal 12 or a serial card 18. In some instances, an encoding terminal 12 could be lost or stolen. Thus, some cards issued from the terminal 12 would be acceptable while others would not. In such a case, the central processing system 14 might identify the last VALID card made at the missing terminal. This minimizes required memory used in the decoding terminal for storing verification information.

If the card is not VALID, as determined as decision of block 312, then control advances to a block 324 at which required data is transmitted to the guard's station terminal 80, in the case of the decode terminal system 70 of FIG. 3 to take appropriate action, such as sounding an alarm or locking doors. The particular action taken depends on the application. This data is also transmitted to the central processing system 14, which at a block 326, recognizes and records the INVALID ID and then may instruct the decoding terminal 16 to take appropriate action. This action might include erasing all data on the ID card 18 or over-write the data with some message such as counterfeit ID or provide a confiscate ID instruction to the terminal operator. Control then advances to the decision block 318, as discussed above.

With reference to FIG. 10, a memory map illustration shows use of memory within the card integrated circuit 22. The memory is sectored to provide an image table 330 for storing the encrypted video image data. A flag's area 332 includes flags returning functionality on or off for specific applications. For example, if the card 18 is a single, universal card for use in multiple end-user systems, these flags would enable which system the card has been authorized for. A user information area 334 may provide medical or other information codes. These codes are used for generating text messages for display in any language, as programmed in the particular decode terminal 16 at which the card 18 is presented. Finally, a transaction log area 336 can be used for recording information on these specific transactions for later retrieval.

The described memory map configuration allows the card 18 itself to be used to fully implement transactions without the requirement of communication with the central processing system 14. Verification is provided by the actual image along with removal of encrypted data. This satisfies the desire to distribute processing to the decoding terminal 16 to minimize communications to the central processing system 14.

Thus, accordance with the invention, there is described a method of validating at a central location a transaction occurring at a remote location, the transaction comprising and presenting the user identification device including memory means for storing fake-proof video information data.

We claim:

1. A method of validating at a central location a transaction occurring at a remote location, the transaction comprising presenting a user identification device including memory means for storing video information data made fake proof by random distribution of non-related verification information data elements, the method comprising the steps of:

transferring from a processing system at the central location to a processing system at the remote location unique digitized system verification information, said digitized verification information comprising a desired verification data table;

operating the remote location processing system in response to a user identification device being presented by reading a video data table from a memory means of the presented user identification device, the video data table including a video information data table having elements of verification data at select distributed locations, separating said verification data from said video data table to provide the information data table, creating an actual verification data table using said separated verification data, comparing said actual verification data table to said desired verification data table to verify authenticity of the user identification device, and communicating with the central location processing system to verity and report authenticity of the presented user identification device; and . recording at the central location processing system a log of remote transactions.

2. The method of claim 1 further comprising the step of converting the video information data table for display on a display device at the remote location to verify authenticity of the user.

3. The method of claim 2 wherein said converting step further comprises the step of decoding compressed digitized video information stored in the information data table.

4. The method of claim 1 wherein said video data table comprises a table of N bytes of data and said separating step includes the steps of creating an offset table using the first M bytes of data, where M<N, said offset table defining an offset value for each of a plurality of index numbers, selecting index values using video table data, and sequentially removing bytes of data from the video data table at positions related to the offset values associated with the selected index values.

5. The method of claim 1 wherein said transferring step comprises transferring digitized system verification information identifying a unique serial number assigned to a terminal used to encode said video data table.

6. The method of claim 1 wherein said transferring step comprises transferring digitized system verification information identifying an issue serial number assigned to the user identification device.

7. The method of claim 1 further comprising the steps of communicating and operating with the central location processing system by receiving transaction verification information from the remote location processing system, performing said recording step, and determining based on the transaction verification information if the user identification device should be updated and in response thereto communicating with the remote location data processing system the update information.

8. The method of claim 7 further comprising the step at the remote location of recording data on the presented user identification device memory means according to the received update information.

9. The method of claim 1 wherein said remote location processing system communicates with said central location processing system by transmitting and receiving radio frequency signals.

10. The method of claim 1 wherein said remote location processing system communicates with said central location processing system by transmitting and receiving telephonic signals.

11. The method of claim 1 wherein said remote location processing system communicates with said central location processing system by transmitting and receiving on a processing system communication network.

12. A method of validating at a central location a transaction occurring at any one of a plurality of remote locations, the transaction comprising presenting a user identification device including memory means for storing video information data made fake proof by random distribution of non-related verification information data elements, the method comprising the steps of:

transferring from a processing system at the central location to a processing system at each remote location unique digitized system verification information, said digitized verification information comprising a desired verification data table;

operating the processing system at any remote location in response to a user identification device being presented by reading a video data table from a memory means of the presented user identification device, the video data table including a video information data table having elements of verification data at select distributed locations, separating said verification data from said video data table to provide the information data table, creating an actual verification data table using said separated verification data, comparing said actual verification data table to said desired verification data table to verify authenticity of the user identification device, and communicating with the central location processing system to verify and report authenticity of the presented user identification device; and recording at the central location processing system a log of remote transactions.

13. The method of claim 12 further comprising the step of converting the video information data table for display on a display device at the remote location at which the device is presented to verify authenticity of the user.

14. The method of claim 13 wherein said converting step further comprises the step of decoding compressed digitized video information stored in the information data table.

15. The method of claim 12 wherein said video data table comprises a table of N bytes of data and said separating step includes the steps of creating an offset table using the first M bytes of data, where M<N, said offset table defining an offset value for each of a plurality of index numbers, selecting index values using video table data, and sequentially removing bytes of data from the video data table at positions related to the offset values associated with the selected index values.

16. The method of claim 12 wherein said transferring step comprises transferring digitized system verification information identifying a unique serial number assigned to a terminal used to encode said video data table.

17. The method of claim 12 wherein said transferring step comprises transferring digitized system verification information identifying an issue serial number assigned to the user identification device.

18. The method of claim 12 further comprising the steps of operating the central location processing system by receiving transaction verification information from the remote location processing system at which the device is presented, performing said recording step, determining based on the transaction verification information if the user identification device should be updated and in response thereto communication with the remote location data processing system at which the device is presented the update information.

19. The method of claim 18 further comprising the step at the remote location at which the device is presented of recording data on the user identification device memory means according to the received update information.

20. The method of claim 12 wherein said remote location processing systems communicate with said central location processing system by transmitting and receiving radio frequency signals.

21. The method of claim 12 wherein said remote location processing systems communicate with said central location processing system by transmitting and receiving telephonic signals.

22. The method of claim 12 wherein said remote location processing systems communicate with said central location processing system by transmitting and receiving on a processing system communication network.

* * * * *